United States Patent
Pape et al.

(10) Patent No.: US 12,008,369 B1
(45) Date of Patent: Jun. 11, 2024

(54) LOAD INSTRUCTION FUSION

(71) Applicant: Apple Inc., Cupertino, CA (US)

(72) Inventors: John D. Pape, Cedar Park, TX (US); Skanda K. Srinivasa, Austin, TX (US); Francesco Spadini, Sunset Valley, TX (US); Brian T. Mokrzycki, Austin, TX (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 17/652,501

(22) Filed: Feb. 25, 2022

Related U.S. Application Data

(63) Continuation of application No. 17/463,321, filed on Aug. 31, 2021, now abandoned.

(51) Int. Cl.
  *G06F 9/30* (2018.01)
  *G06F 9/38* (2018.01)

(52) U.S. Cl.
  CPC ........ *G06F 9/30043* (2013.01); *G06F 9/3001* (2013.01); *G06F 9/30058* (2013.01); *G06F 9/3016* (2013.01); *G06F 9/30185* (2013.01); *G06F 9/3838* (2013.01); *G06F 9/3858* (2023.08); *G06F 9/3861* (2013.01)

(58) Field of Classification Search
  CPC .................. G06F 9/30185; G06F 9/30181
  See application file for complete search history.

(56) References Cited

U.S. PATENT DOCUMENTS

| | | | |
|---|---|---|---|
| 5,420,992 A * | 5/1995 | Killian | ................ G06F 9/30192 |
| | | | 712/E9.035 |
| 5,689,695 A | 11/1997 | Read | |
| 5,774,737 A | 6/1998 | Nakano | |
| 5,794,063 A | 8/1998 | Favor | |
| 6,292,888 B1 | 9/2001 | Nemirovsky | |
| 6,295,599 B1 | 9/2001 | Hansen | |
| 6,338,136 B1 * | 1/2002 | Col | ........................ G06F 9/3806 |
| | | | 712/210 |

(Continued)

FOREIGN PATENT DOCUMENTS

WO   2019218896 A1   11/2019

OTHER PUBLICATIONS

J. E. Smith, "Future Superscalar Processors Based on Instruction Compounding," Published 2007, Computer Science, pp. 121-131.

(Continued)

*Primary Examiner* — Keith E Vicary
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that relate to executing fused instructions. A processor may include a decoder circuit and a load/store circuit. The decoder circuit may detect a load/store instruction to load a value from a memory and detect a non-load/store instruction that depends on the value to be loaded. The decoder circuit may fuse the load/store instruction and the non-load/store instruction such that one or more operations that the non-load/store instruction is defined to perform are to be executed within the load/store circuit. The load/store circuit may receive an indication of the fused load/store and non-load/store instructions and then execute one or more operations of the load/store instruction and the one or more operations of the non-load/store instruction using a circuit included in the load/store circuit.

20 Claims, 10 Drawing Sheets

(56) References Cited

U.S. PATENT DOCUMENTS

| | | | |
|---|---|---|---|
| 6,560,624 B1 | 5/2003 | Otani | |
| 7,055,022 B1* | 5/2006 | Col | G06F 9/324 |
| | | | 712/E9.033 |
| 9,501,286 B2* | 11/2016 | Col | G06F 9/3017 |
| 10,324,724 B2 | 6/2019 | Lai et al. | |
| 10,579,389 B2 | 3/2020 | Caulfield et al. | |
| 2003/0236966 A1* | 12/2003 | Samra | G06F 9/3017 |
| | | | 712/225 |
| 2004/0034757 A1* | 2/2004 | Gochman | G06F 9/30145 |
| | | | 711/219 |
| 2004/0128483 A1* | 7/2004 | Grochowski | G06F 9/30181 |
| | | | 712/217 |
| 2005/0084099 A1 | 4/2005 | Montgomery | |
| 2007/0038844 A1* | 2/2007 | Valentine | G06F 9/3853 |
| | | | 712/219 |
| 2010/0115248 A1 | 5/2010 | Ouziel | |
| 2011/0035570 A1* | 2/2011 | Col | G06F 9/3893 |
| | | | 712/23 |
| 2011/0264896 A1* | 10/2011 | Parks | G06F 9/3861 |
| | | | 712/E9.017 |
| 2011/0264897 A1* | 10/2011 | Henry | G06F 9/3861 |
| | | | 712/226 |
| 2013/0024937 A1 | 1/2013 | Glew | |
| 2013/0125097 A1 | 5/2013 | Ebcioglu | |
| 2013/0179664 A1 | 7/2013 | Olson | |
| 2013/0262841 A1* | 10/2013 | Gschwind | G06F 9/3836 |
| | | | 712/226 |
| 2014/0047221 A1* | 2/2014 | Irwin | G06F 9/30181 |
| | | | 712/226 |
| 2014/0208073 A1* | 7/2014 | Blasco-Allue | G06F 9/3001 |
| | | | 712/205 |
| 2014/0281397 A1 | 9/2014 | Loktyukhin | |
| 2014/0351561 A1* | 11/2014 | Parks | G06F 9/3017 |
| | | | 712/211 |
| 2015/0039851 A1* | 2/2015 | Uliel | G06F 9/30032 |
| | | | 712/4 |
| 2015/0089145 A1 | 3/2015 | Steinmacher-Burow | |
| 2016/0004504 A1 | 1/2016 | Elmer | |
| 2016/0179542 A1* | 6/2016 | Lai | G06F 9/30021 |
| | | | 712/208 |
| 2016/0291974 A1 | 10/2016 | Lingam | |
| 2017/0102787 A1 | 4/2017 | Gu | |
| 2017/0123808 A1* | 5/2017 | Caulfield | G06F 9/3836 |
| 2017/0177343 A1* | 6/2017 | Lai | G06F 9/3016 |
| 2018/0129498 A1 | 5/2018 | Levison et al. | |
| 2018/0129501 A1* | 5/2018 | Levison | G06F 9/3802 |
| 2018/0267775 A1* | 9/2018 | Gopal | G06F 9/30025 |
| 2018/0300131 A1 | 10/2018 | Tannenbaum | |
| 2019/0056943 A1 | 2/2019 | Gschwind | |
| 2019/0102197 A1 | 4/2019 | Kumar | |
| 2019/0108023 A1 | 4/2019 | Lloyd | |
| 2020/0042322 A1 | 2/2020 | Wang et al. | |
| 2020/0402287 A1 | 12/2020 | Shah | |
| 2021/0124582 A1 | 4/2021 | Kerr | |
| 2022/0019436 A1 | 1/2022 | Lloyd | |
| 2022/0035634 A1* | 2/2022 | Lloyd | G06F 9/30043 |

OTHER PUBLICATIONS

Christopher Celio et al., "The Renewed Case for the Reduced Instruction Set Computer: Avoiding ISA Bloat with Macro-Op Fusion for RISC-V," arXiv:1607.02318v1 [cs.AR] Jul. 8, 2016; 16 pages.

Abhishek Deb et al., "SoftHV : A HW/SW Co-designed Processor with Horizontal and Vertical Fusion," CF'11, May 3-5, 2011, 10 pages.

Ian Lee, "Dynamic Instruction Fusion," UC Santa Cruz Electronic Theses and Dissertations, publication date Dec. 2012, 59 pages.

* cited by examiner

LOAD INSTRUCTION FUSION

PRIORITY CLAIM

The present application is a continuation of U.S. application Ser. No. 17/463,321, filed Aug. 31, 2021, which is incorporated by reference herein in its entirety.

BACKGROUND

Technical Field

This disclosure relates generally to a computer processor and, more specifically, to the fusion and execution of load instructions with other types of instructions.

Description of the Related Art

Modern computer systems often include processors that are integrated onto a chip with other computer components, such as a graphics processing unit (GPU). During operation, those processors execute instructions to implement various software routines, such as user software applications and an operating system. As part of implementing a software routine, a processor normally executes various different types of instructions, such as a load instruction to retrieve a value from a memory that is coupled to the processor, an arithmetic instruction to manipulate the value, and a store instruction to return the value back to memory. A processor also typically executes instructions that are designed to control the execution flow of a software routine. For example, a processor may execute a conditional branch instruction that causes the processor to jump to a certain instruction if a specified condition is met.

SUMMARY

Various embodiments for fusing a load instruction with a non-load instruction such that one or more operations that the non-load/store instruction is defined to perform are executed in a load/store circuit. Broadly speaking, a processor of a computer system includes a decoder circuit, a load/store circuit, and a branch prediction circuit. The decoder circuit may comprise an instruction decoding section and an operation mapping, renaming, dispatching section that are coupled to the load/store circuit and the branch prediction circuit. The decoder circuit may detect a load/store instruction to load a value from a memory and detect a non-load/store instruction (e.g., a conditional branch instruction, an ALU instruction, etc.) that depends on the value. The decoder circuit may fuse those instructions such that one or more operations that the non-load/store instruction is defined to perform are to be executed within the load/store circuit. In some cases, the decoder circuit overloads a portion of the load operation of the load instruction with a fusion bit and index information for accessing fusion information about the one or more operations of the non-load/store instruction. The decoder circuit may dispatch the fused load operation to the load/store circuit. The load/store circuit may then execute the load operation and the one or more operations of the non-load/store instruction utilizing the fusion information.

DETAILED DESCRIPTION

Figure 1:
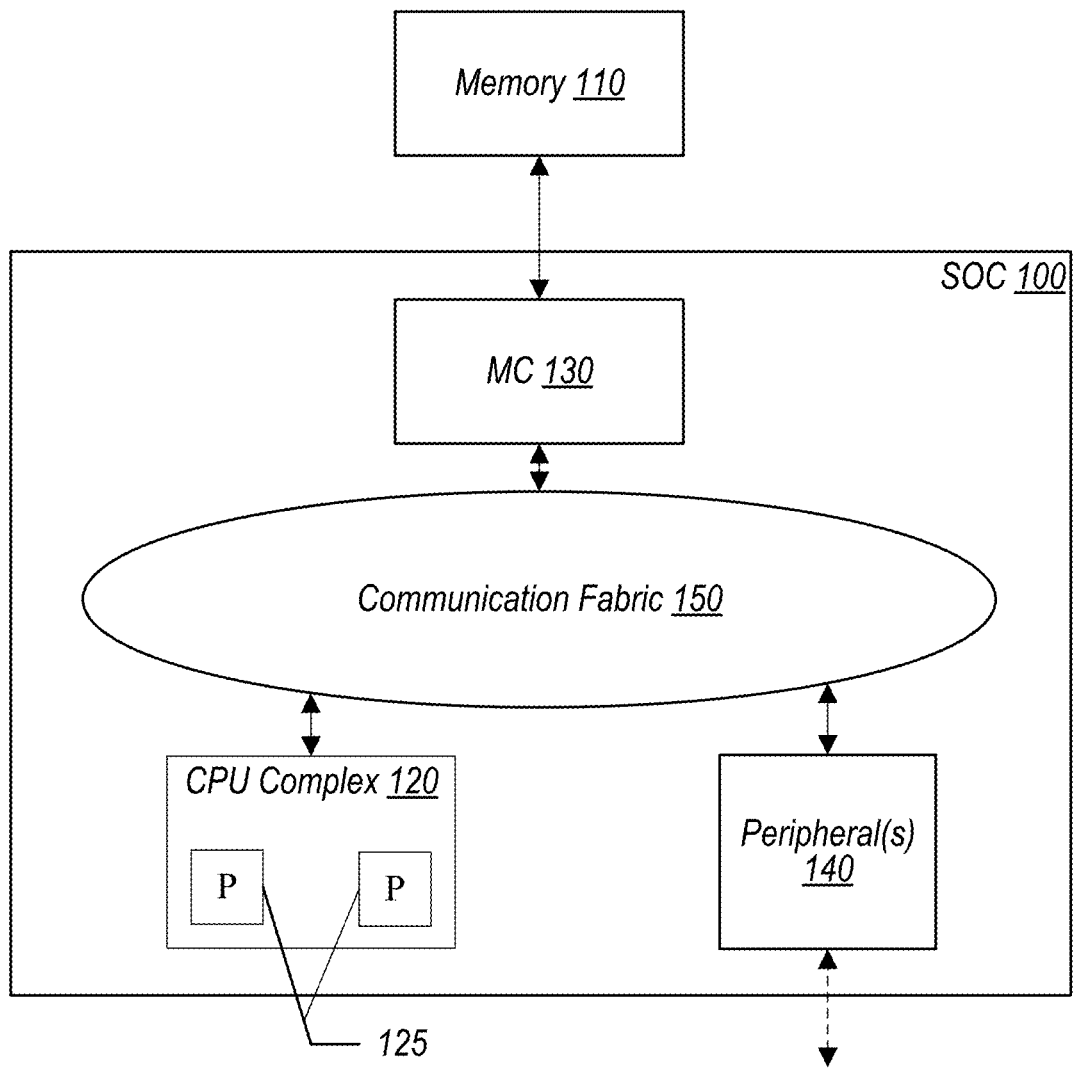
FIG. 1 is a block diagram illustrating example elements of a system on a chip (SOC) that is coupled to a memory, according to some embodiments.

As mentioned above, when executing a software routine, a processor typically executes load instructions, arithmetic logic unit (ALU) instructions, and conditional branch instructions along with other types of instructions. As used herein, the term "ALU instruction" refers to an instruction that can be executed in a typical ALU, such as an arithmetic instruction (e.g., ADD, SUB, etc.), a logic instruction (e.g., AND, OR, XOR, etc.), or a bitwise shift/rotate instruction. In many cases, ALU instructions and conditional branch instructions are dependent on the values (or, load results) that are loaded by load instructions. For example, a conditional branch instruction may involve comparing a load result of a load instruction to a value (e.g., zero) and branching if they match. Accordingly, in the absence of fusion as disclosed herein, the load instruction is executed in a load/store unit that loads and forwards the load result to a branch execution unit within a first time period (which could correspond to a single clock cycle or multiple clock cycles) and then the comparison is performed by the branch execution unit within a second, subsequent time period. In a similar manner for ALU instructions in the absence of fusion, the load/store unit loads and forwards the load result to an execution unit external to the load/store unit in a first time period and then the operation(s) of an ALU instruction are performed by the execution unit in a second time period. In both of these cases, a time period is spent forwarding the load result to the execution unit that spends another time period performing a simple operation on the load result. It may be desirable to perform the instructions in a more efficient manner such that, for example, the overall execution latency is reduced. Accordingly, this present disclosure addresses, among other things, the technical problems pertaining to performing the instructions in a more efficient manner.

The present disclosure describes techniques for fusing load/store instructions with non-load/store instructions (e.g., conditional branch instructions, ALU instructions, etc.) such that one or more of the operation(s) that the non-load/store instructions are defined to perform are executed in a load/store unit. In various embodiments described below, a processor includes a decoder unit, a load/store unit, and a set of execution units (e.g., a branch execution unit), all of which are coupled together. The decoder unit receives fetched instructions that include load and non-load instructions and determines whether a load instruction and a non-load instruction are related and can be fused. In response to detecting fusible instructions, the decoder unit may fuse the instructions and provide information about the fusion to the load/store unit. In the case that a load instruction and a conditional branch instruction are fused, in various embodiments, the load/store unit loads the load result of the load instruction, performs the comparison of the conditional branch instruction on the load result, and provides a comparison result to a branch execution unit that is separate from the load/store unit. For the case in which a load instruction and an ALU instruction (or another type of instruction) are fused, in various embodiments, the load/store unit loads the load result of the load instruction, performs one or more operations of the ALU instruction, and forwards the result to one or more destinations. In both cases, the arrival of the load result, the operation(s) on the load result, and the forwarding of the result of those operations can occur in the load/store unit within a shorter time period than if the load result was forwarded to a separate unit to perform the operation(s). Also, power consumption may be reduced by not exercising as much logic in the separate unit, and performance may be increased by leaving the separate unit available to execute other instructions.

These techniques may be advantageous over prior approaches as the techniques may reduce the branch misprediction penalty associated with a conditional branch instruction by one or more cycles relative to the unfused case discussed earlier. In particular, since the load result is obtained and compared in the load/store unit within the same time period (e.g., the same clock cycle) instead of sending the load result to the branch execution unit to perform the comparison defined by the conditional branch instruction, one or more clock cycles are saved that would otherwise have been spent by the branch execution unit to cache the load result before it could be compared in a subsequent time period. Similarly, one or more clock cycles may be saved in relation to certain arithmetic operations as those operations are performed in the load/store unit within the same time period that the load result is obtained instead of spending an additional time period to send the load result to an execution unit for performing the operations. Furthermore, fusing a load instruction with a non-load instruction can reduce the number of resources that would otherwise be consumed by processing those instructions separately. For example, an entry of a re-order buffer may be saved by storing one instruction instead of two instructions and an additional physical register may not have to be allocated. As a result, less power may be consumed in order to execute the fused instruction. An example application of these techniques will now be discussed, starting with reference to FIG. 1.

Turning now to FIG. 1, a block diagram of an example system on a chip (SOC) 100 that is coupled to a memory 110 is depicted. As implied by the name, the components of SOC 100 can be integrated onto a single semiconductor substrate as an integrated circuit "chip." In some cases, however, the components are implemented on two or more discrete chips in a computing system. In the illustrated embodiment, the components of SOC 100 include a central processing unit (CPU) complex 120, a memory controller (MC) 130, one or more peripheral components 140 (more briefly, "peripherals"), and a communication fabric 150. Components 120, 130, and 140 are all coupled to communication fabric 150 as depicted, and memory controller 130 may be coupled to memory 110 during use. Also as shown, CPU complex 120 includes at least two processors 125 (P 125 in FIG. 1). In some embodiments, SOC 100 is implemented differently than shown. For example, SOC 100 may include an always-on component, a display controller, a power management circuit, etc. It is noted that the number of components of SOC 100 (and the number of subcomponents for those shown in FIG. 1, such as within the CPU complex 120) may vary between embodiments. Accordingly, there may be more or fewer of each component or subcomponent than the number shown in FIG. 1.

Memory 110, in various embodiments, is usable to store data and program instructions that are executable by CPU complex 120 to cause a system having SOC 100 and memory 110 to implement operations described herein. Memory 110 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), etc. Memory available to SOC 100 is not limited to primary storage such as memory 110. Rather, SOC 100 may further include other forms of storage such as cache memory (e.g., L1 cache, L2 cache, etc.) in CPU complex 120.

CPU complex 120, in various embodiments, includes a set of processors 125 that serve as a CPU of the SOC 100. Processors 125 may execute the main control software of the system, such as an operating system. Generally, software executed by the CPU during use control the other components of the system to realize the desired functionality of the system. Processors 125 may further execute other software, such as application programs. An application program may provide user functionality and rely on the operating system for lower-level device control, scheduling, memory management, etc. Consequently, processors 125 may also be referred to as application processors. CPU complex 120 may include other hardware such as an L2 cache and/or an interface to the other components of the system (e.g. an interface to communication fabric 150).

A processor 125, in various embodiments, includes any circuitry and/or microcode that is configured to execute instructions defined in an instruction set architecture implemented by that processor 125. Processors 125 may fetch instructions and data from memory 110 as a part of executing load instructions and store the fetched instructions and data within caches of CPU complex 120. In various embodiments, processors 125 share a common last level cache (e.g., an L2 cache) while including their own caches (e.g., an L0 cache, an L1 cache, etc.) for storing instructions and data. Processors 125 may retrieve instructions and data (e.g., from the caches) and execute the instructions (e.g., conditional branch instructions, ALU instructions, etc.) to perform operations that involve the retrieved data. Processors 125 may then write a result of those operations back to memory 110. As discussed in greater detail further below, a processor 125 includes circuits for fusing load instructions with non-load instructions such that one or more of the operations that the non-load instructions are defined to perform are executed within a load/store unit. Processors 125 may encompass discrete microprocessors, processors and/or microprocessors integrated into multichip module implementations, processors implemented as multiple integrated circuits, etc.

Memory controller 130, in various embodiments, includes circuitry that is configured to receive, from the other components of SOC 100, memory requests (e.g., load/store requests) to perform memory operations, such as accessing data from memory 110. Memory controller 130 may be configured to access any type of memory 110, such as those discussed earlier. In various embodiments, memory controller 130 includes queues for storing memory operations, for ordering and potentially reordering the operations and presenting the operations to memory 110. Memory controller 130 may further include data buffers to store write data awaiting write to memory 110 and read data awaiting return to the source of a memory operation. In some embodiments, memory controller 130 may include a memory cache to store recently accessed memory data. In SOC implementations, for example, the memory cache may reduce the power consumption in SOC 100 by avoiding re-access of data from memory 110 if it is expected to be accessed again soon. In some cases, the memory cache may also be referred to as a system cache, as opposed to private caches (e.g., L1 caches) in processors 125 that serve only certain components. But, in some embodiments, a system cache need not be located within memory controller 130.

Peripherals 140, in various embodiments, are sets of additional hardware functionality included in SOC 100. For example, peripherals 140 may include video peripherals such as an image signal processor configured to process image capture data from a camera or other image sensor, GPUs, video encoder/decoders, scalers, rotators, blenders, display controllers, etc. As other examples, peripherals 140 may include audio peripherals such as microphones, speakers, interfaces to microphones and speakers, audio processors, digital signal processors, mixers, etc. Peripherals 140 may include interface controllers for various interfaces external to SOC 100, such as Universal Serial Bus (USB), peripheral component interconnect (PCI) including PCI Express (PCIe), serial and parallel ports, etc. The interconnection to external devices is illustrated by the dashed arrow in FIG. 1 that extends external to SOC 100. Peripherals 140 may include networking peripherals such as media access controllers (MACs).

Communication fabric 150 may be any communication interconnect and protocol for communicating among the components of SOC 100. For example, communication fabric 150 may enable processors 125 to issue and receive requests from peripherals 140 to access, store, and manipulate data. In some embodiments, communication fabric 150 is bus-based, including shared bus configurations, crossbar configurations, and hierarchical buses with bridges. In some embodiments, communication fabric 150 is packet-based, and may be hierarchical with bridges, crossbar, point-to-point, or other interconnects.

Figure 2:
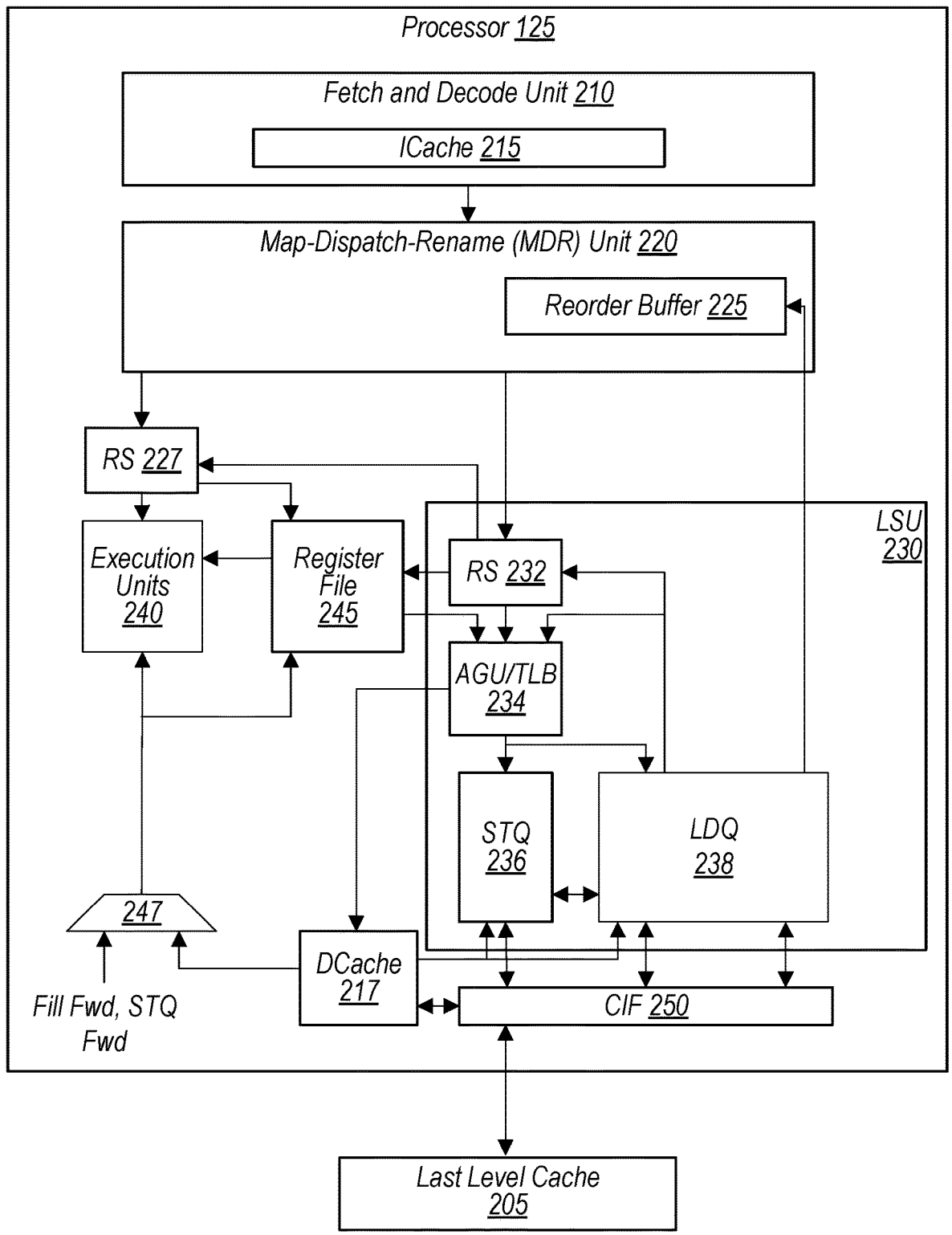
FIG. 2 is a block diagram illustrating example elements of a processor included on the SOC, according to some embodiments.

Turning now to FIG. 2, a block diagram of an example processor 125 is shown. In the illustrated embodiment, processor 125 includes a fetch and decode unit 210, a map-dispatch-rename (MDR) unit 220, a set of reservation stations (RSs) 227 and 232, one or more execution units 240, a register file 245, a data cache, or "DCache", 217, a load/store unit (LSU) 230, and a core interface unit (CIF) 250. As depicted, fetch and decode unit 210 includes an instruction cache, or "ICache", 215 and is coupled to MDR unit 220, which includes a reorder buffer 225 and is coupled to RS 227 and LSU 230. More particularly, MDR unit 220 is coupled to an RS 232 in LSU 230. RS 227 is coupled to execution units 240, and reorder buffer 225 is coupled to a load queue (LDQ) 238 in LSU 230. As depicted, register file 245 is coupled to execution units 240 and LSU 230 (more particularly, RS 232 and an address generation unit/translation lookaside buffer (AGU/TLB) 234). AGU/TLB 234 is coupled to DCache 217, which is coupled to CIF 250 and a multiplexor 247 that is coupled to execution units 240 and register file 245. Another input of multiplexor 247 is coupled to receive other data (e.g. fill forward data from CIF 250 and/or forward data from a store queue 236 (STQ 236) in LSU 230. DCache 217 is coupled to STQ 236 and LDQ 238 in LSU 230. AGU/TLB 234 is coupled to RS 232, STQ 236, and LDQ 238. STQ 236 is coupled to LDQ 238, both of which are coupled to CIF 250.

Fetch and decode unit 210, in various embodiments, is configured to fetch instructions for execution by processor 125 and decode the instructions into instructions operations (briefly "ops") for execution. More particularly, fetch and decode unit 210 may be configured to cache instructions fetched from a memory (e.g., memory 110) through CIF 250 in ICache 215, and may fetch a speculative path of instructions for processor 125. Fetch and decode unit 210 may implement various prediction structures for predicting the fetch path, such as one that predicts fetch addresses based on previously executed instructions. In various embodiments, fetch and decode unit 210 may decode an instruction into multiple ops depending on the complexity of that instruction. Particularly complex instructions may be microcoded. In such embodiments, the microcode routine for an instruction may be coded in ops. In other embodiments, however, each instruction within the instruction set architecture implemented by processor 125 may be decoded into a single op, and thus the op can be synonymous with instruction (although it may be modified in form by the decoder).

In various embodiments, fetch and decode unit 210 is configured to identify candidate instructions for fusion and provide an indication of those instructions to MDR unit 220. Fetch and decode unit 210 may scan across its decode lanes to search for particular combinations of instructions. Such combinations may include, but are not limited to: a load instruction and a compare-and-branch-if-zero (CBZ) branch instruction; a load instruction and a test-bit-and-branch-if-zero (TBZ) branch instruction; and a load instruction and an ALU instruction, such as an ADD instruction. In various embodiments, a combination may be eligible for fusion if a result of the load instruction is used by the other instruction of the combination. Particular types of load instructions might not be considered for fusion, such as a non-integer destination load. Particular types of branch or ALU instructions might not be considered for fusion, such as those requiring multiple register operands or those that set condition flags. The instructions of a combination might also not be eligible for fusion if the instructions are not sequential or otherwise within a specified instruction distance (e.g., three instructions) of each other in program order, or if the instructions fall within different batches of instructions ("instruction groups"). In various embodiments, fetch and decode unit 210 marks eligible combinations (e.g., by setting bits of the instructions) and provides them to MDR unit 220. In some embodiments, the fusion of those instructions occurs within fetch and decode unit 210.

ICache 215 and DCache 217, in various embodiments, may each be a cache having any desired capacity, cache line size, and configuration. A cache line may be allocated/deallocated in a cache as a unit and thus may define the unit of allocation/deallocation for the cache. Cache lines may vary in size (e.g. 32 bytes, 64 bytes, or larger or smaller).

Different caches may have different cache line sizes. There may further be more additional levels of cache between ICache 215/DCache 217 and the main memory, such as a last level cache. In various embodiments, ICache 215 is used to cache fetched instructions and DCache 217 is used to cache data fetched or generated by processor 125.

MDR unit 220, in various embodiments, is configured to map ops received from fetch and decode unit 210 to speculative resources (e.g. physical registers) in order to permit out-of-order and/or speculative execution. As shown, MDR unit 220 can dispatch the ops to RS 227 and RS 232 in LSU 230. The ops may be mapped to physical registers in register file 245 from the architectural registers used in the corresponding instructions. That is, register file 245 may implement a set of physical registers that are greater in number than the architectural registers specified by the instruction set architecture implemented by processor 125. Accordingly, MDR unit 220 may manage a mapping between the architectural registers and the physical registers. In some embodiments, there may be separate physical registers for different operand types (e.g. integer, floating point, etc.). The physical registers, however, may be shared between different operand types. MDR unit 220, in various embodiments, tracks the speculative execution and retires ops (or flushes misspeculated ops). In various embodiments, reorder buffer 225 is used in tracking the program order of ops and managing retirement/flush.

In various embodiments, MDR unit 220 is configured to fuse eligible combination pairs that are marked by fetch and decode unit 210 if certain criteria are met. As discussed in greater detail with respect to FIG. 3, MDR unit 220 includes a fusion table that is configured to maintain information about a fused instruction pair. If the fusion table has less than a threshold number of available entries (e.g., five entries), then MDR unit 220 may not fuse an eligible combination pair. If a combination pair crosses an instruction group boundary, then MDR unit 220 may not fuse that combination pair. In response to identifying an eligible combination pair that satisfies the fusion criteria, in various embodiments, MDR unit 220 fuses the instructions (or the ops of the instructions) into a single instruction (or a smaller set of ops, such as a single op). As a part of fusing that pair, MDR unit 220 may write information about the fused instruction pair into the fusion table. In various embodiments, the fusion of an eligible combination pair results in a single load op that has been overloaded such that one or more ops of the other instruction are performed as a part of executing that fused load op. For example, a portion of the load op may be overloaded with a fusion bit and index information for accessing an entry of the fusion table. The fusion bit indicates to LSU 230 that the load op is a fused op and thus should be handled differently than a normal load op. After fusing a combination pair, MDR unit 220 may dispatch the resulting fused load op to LSU 230 via RS 232. In some embodiments, if a load instruction is fused with a CBZ or TBZ instruction, then the CBZ/TBZ instruction is marked as complete at dispatch. While fusion of instructions occurs at MDR unit 220 in various embodiments, in some embodiments, fusion occurs at a different stage in the instruction pipeline, such as at the instruction buffer or the instruction cache. That is, the fusion decoder circuitry used to perform the fusion of instructions may be reside at different stages of the instruction pipeline in different implementations.

LSU 230, in various embodiments, is configured to execute memory ops received from MDR unit 220. Generally, a memory op is an instruction op specifying an access to memory (e.g., memory 110), although that memory access may be completed in a cache such as DCache 217. As such, a load memory op may specify a transfer of data from a memory location to a register of processor 125, while a store memory op may specify a transfer of data from a register to a memory location. Load memory ops can be referred to as load ops or loads, and store memory ops can be referred to as store ops or stores. In various cases, the instruction set architecture implemented by processor 125 permits memory accesses to different addresses to occur out of order but may require memory accesses to the same address (or overlapping addresses, where at least one byte is accessed by both overlapping memory accesses) to occur in program order.

LSU 230 may implement multiple load pipelines ("pipes"). As an example, three load pipelines may be implemented, although more or fewer pipelines can be implemented in other cases. Each pipeline may execute a different load, independent and in parallel with other loads in other pipelines. Consequently, reservation station 232 may issue any number of loads up to the number of load pipes in the same clock cycle. A load pipeline and the process of handling a fused load and conditional branch instruction pair are discussed in greater detail with respect to FIGS. 3 and 4. Similarly, LSU 230 may further implement one or more store pipes. In some embodiments, the number of store pipes is not equal to the number of load pipes. For example, two store pipes may be used instead of three store pipes. Likewise, reservation station 232 may issue any number of stores up to the number of store pipes in the same clock cycle.

Load/store ops, in various embodiments, are received at reservation station 232, which may be configured to monitor the source operands of the load/store ops to determine when they are available and then issue the ops to the load or store pipelines, respectively. AGU/TLB 234 may be coupled to one or more initial stages of the pipelines mentioned earlier. Some source operands may be available when the operations are received at reservation station 232, which may be indicated in the data received by reservation station 232 from MDR unit 220 for the corresponding operation. Other operands may become available via execution of operations by other execute units 240 or even via execution of earlier load ops. The operands may be gathered by reservation station 232, or may be read from a register file 245 upon issue from reservation station 232 as shown in FIG. 2. In some embodiments, reservation station 232 is configured to issue load/store ops out of order (from their original order in the code sequence being executed by processor 125) as the operands become available.

AGU/TLB 234, in various embodiments, is configured to generate the address accessed by a load/store op when the load/store op is sent from reservation station 232. AGU/TLB 234 may further be configured to translate that address from an effective or virtual address created from the address operands of the load/store op to a physical address that may actually be used to address memory. In some embodiments, AGU/TLB 234 is configured to generate an access to DCache 217.

STQ 236, in various embodiments, track stores from initial execution to retirement by LSU 230 and may be responsible for ensuring that the memory ordering rules are not violated. Load ops may update an LDQ 238 entry preassigned to the load ops, and store ops may update STQ 236, to enforce ordering among operations. The store pipes may be coupled to STQ 236, which is configured to hold store ops that have been executed but have not committed. In some embodiments, STQ 236 is configured to detect that a load op hits on a store op during execution of the load op, and is further configured to cause a replay of the load op based on the detection of a hit on the store op and a lack of store data associated with the store op in STQ 236.

LDQ 238, in various embodiments, track loads from initial execution to retirement by LSU 230. LDQ 238 may be responsible for ensuring the memory ordering rules are not violated (between out of order executed loads, as well as between loads and stores). In the event that a memory ordering violation is detected, LDQ 238 may signal a redirect for the corresponding load. The redirect may cause processor 125 to flush that load and subsequent ops in program order, and refetch the corresponding instructions. Speculative state for the load and subsequent ops is discarded and the ops may be refetched by fetch and decode unit 210 and reprocessed to be executed again.

Execution units 240, in various embodiments, include any types of execution units. For example, execution units 240 may include integer execution units configured to execute integer ops, floating point execution units configured to execute floating point ops, or vector execution units configured to execute vector ops. As discussed in more detail with respect to FIGS. 3 and 4, execution units 240 can include a branch execution unit. Generally, integer ops are ops that perform a defined operation (e.g. arithmetic, logical, shift/rotate, etc.) on integer operands and floating point ops are ops that have been defined to operate on floating point operands. Vector ops may be used to process media data (e.g. image data such as pixels, audio data, etc.). As such, each execution unit 240 may comprise hardware configured to perform the operations defined for the ops that that execution unit is defined to handle. Execution units 240 may generally be independent of each other in that each execution unit may be configured to operate on an op that was issued to that execution unit without dependence on other execution units 240. Different execution units 240 may have different execution latencies (e.g., different pipe lengths). Any number and type of execution units 240 may be included in various embodiments, including embodiments having one execution unit 240 and embodiments having multiple execution units 240.

CIF 250, in various embodiments, is responsible for communicating with the rest of the system that includes processor 125, on behalf of processor 125. For example, CIF 250 may be configured to request data for ICache 215 misses and DCache 217 misses. When the data is returned, CIF 250 may then signal the cache fill to the corresponding cache. For DCache fills, CIF 250 may inform LSU 230 (and more particularly LDQ 238). In some cases, LDQ 238 may schedule replayed loads that are waiting on the cache fill so that the replayed loads forward the fill data as it is provided to DCache 217 (referred to as a fill forward operation). If the replayed load is not successfully replayed during the fill, then that replayed load may be subsequently scheduled and replayed through DCache 217 as a cache hit. CIF 250 may writeback modified cache lines that have been evicted by DCache 217, merge store data for non-cacheable stores, etc. As shown, CIF 250 can interact with a last level cache 205.

Figure 3:
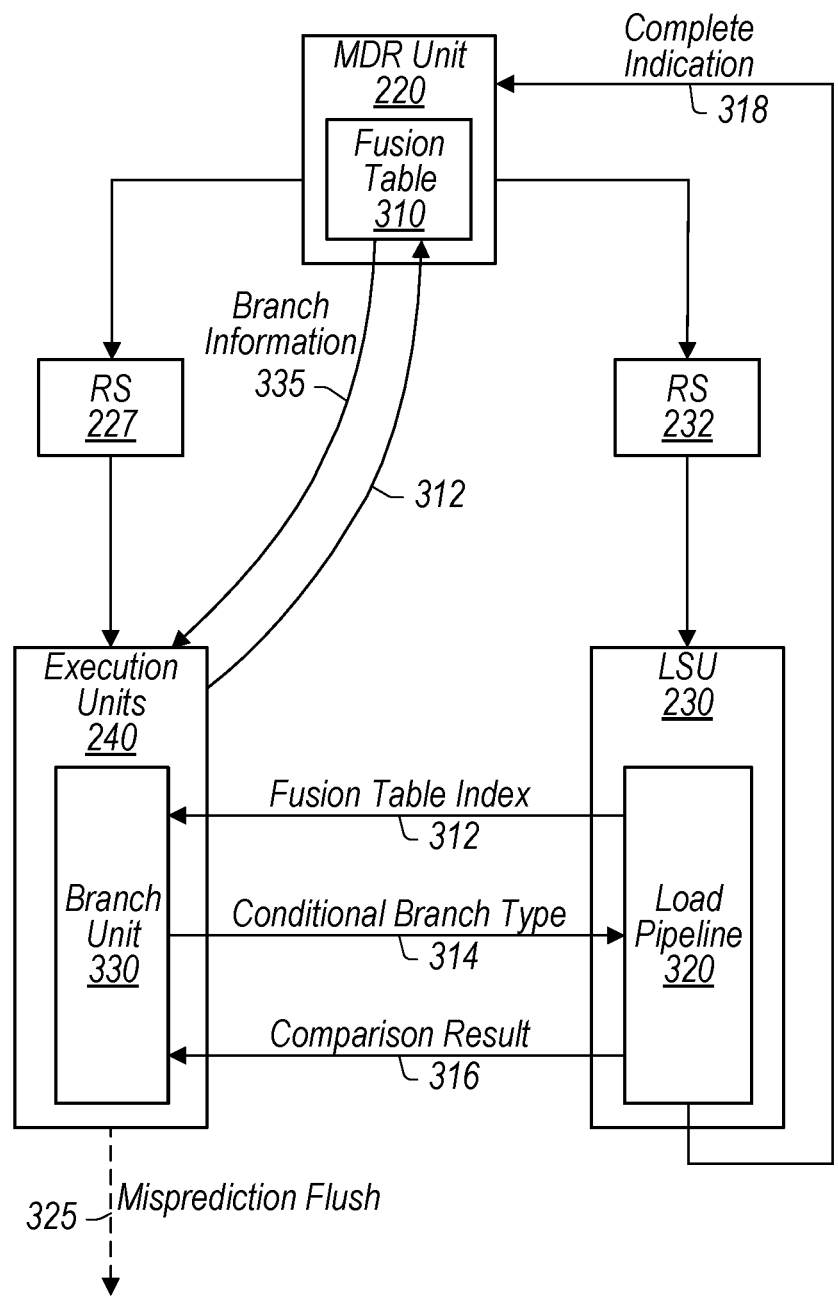
FIG. 3 is a block diagram illustrating example elements of a map-dispatch-rename unit, an execution unit, and a load/store unit (LSU), according to some embodiments.

Turning now to FIG. 3, a block diagram of example elements involved in the processing of a fused load and conditional branch instruction pair is depicted. The illustrated embodiment includes MDR unit 220, RS 227 and 232, LSU 230, and execution units 240. As further shown, MDR unit 220 includes a fusion table 310, LSU 230 includes a load pipeline 320, and execution units 240 include a branch unit 330. While the illustrated embodiment depicts one load pipeline 320 and one branch unit 330, in some embodiments, there are multiple load pipelines 320 and multiple branch units 330. The illustrated embodiment might be implemented differently. For example, fusion table 310 may be separate from MDR unit 220.

As mentioned, MDR unit 220 may be configured to fuse combination pairs (e.g., a load instruction and a conditional branch instruction) and store information about those fused pairs in fusion table 310. Fusion table 310, in various embodiments, is circuitry that is configured to store, in a given entry of fusion table 310, fusion information that can be accessed using index information. In many cases, the fusion information concerns the branch instruction portion of the fused pair and allows for correct branch execution. As an example, the fusion information may specify: a branch payload that can be used to discern a branch type and a branch direction; a program counter (PC) offset and a PC index to a PC table that stores the upper portion of one or more PC values; and a bit index that may be used to determine which bit(s) of a load result to compare for the conditional branch instruction. As mentioned, MDR unit 220 may overload a load op with the index information for accessing the appropriate entry of fusion table 310 for the fused pair. In particular, a load op may include a tag portion used for load pairs. In various embodiments, the loads that are eligible for fusion do not include load pairs and thus that tag portion is available and is used to store a fusion table index 312 to the entry of fusion table 310 associated with that fused pair. After overloading the load op, MDR unit 220 may dispatch the load op to LSU 230 via RS 232 for execution in load pipeline 320.

Load pipeline 320, in various embodiments, is circuitry configured to execute load ops to transfer data from a memory location to a register within processor 125. Load pipeline 320 is further configured to execute comparisons that are defined by conditional branch instructions that have been fused with load instructions and to send the results of the comparisons to branch unit 330. Consequently, load pipeline 320 may include one or more pipeline stages in which it interacts with branch unit 330. After receiving a load op from RS 232, in various embodiments, load pipeline 320 detects whether that load op is a fused load op based on whether one or more bits of the load op have been set to a certain value. In the case of a fused load op, load pipeline 320 may further determine a type of the fused load op—e.g., whether the load was fused with a branch instruction, an ALU instruction, etc. In response to detecting a fused load op that corresponds to the fusion of a load instruction with a branch instruction, load pipeline 320 may issue a command to branch unit 330 to cause branch unit 330 to generate the target address for the branch and to prepare to receive a comparison result 316 from load pipeline 320. In some embodiments, the issued command includes a fusion table index 312 extracted by load pipeline 320 from the fused load op.

Branch unit 330, in various embodiments, is circuitry configured to execute branch ops derived from branch instructions. In some cases, branch unit 330 is part of an integer execution unit that also performs integer arithmetic ops. After receiving the command from load pipeline 320, in various embodiments, branch unit 330 accesses branch information 335 from fusion table 310 using the fusion table index 312 received from load pipeline 320. Branch information 335 may include a subset or all of the fusion information stored in an entry of fusion table 310. For example, branch information 335 may include a branch payload that can be used to discern the branch type. In various embodiments, branch unit 330 determines a conditional branch type 314 for the branch portion of the fused pair based on branch information 335 and provides an indication of that type back to load pipeline 320 as shown. As discussed in greater detail with respect to FIG. 4, branch unit 330 can provide masking information to enable load pipeline 320 to build a mask for performing the branch comparison on the appropriate portion (e.g., bit) of the load result of the fused load op. In some embodiments, load pipeline 320 is configured to obtain branch information 335 from fusion table 310 using a fusion table index 312 and identify the conditional branch type 314 for the branch portion of the fused pair instead of branch unit 330.

In conjunction with issuing the command to branch unit 330, in various embodiments, load pipeline 320 issues memory requests to fetch the data from the memory location identified from the fused load op. Consequently, load pipeline 320 may receive a load result that includes the data. In response to receiving an indication of the conditional branch type 314 of the branch and the load result, in various embodiments, load pipeline 320 compares that load result (or a portion thereof, such as single bit) to a value (e.g., zero) associated with the conditional branch type 314. If the load result equals that value, then load pipeline 320 sends a comparison result 316 to branch unit 330 that indicates that the predicted branch direction should be taken (or, in some embodiments, should not be taken). Load pipeline 320 may issue a complete indication 318 to MDR unit 220 to indicate that the fused load op is complete. If the load result does not equal the value, then load pipeline 320 sends a comparison result 316 to branch unit 330 that indicates that the predicted branch direction is incorrect. In response to that comparison result 316, in various embodiments, branch unit 330 issues a misprediction flush 325 in order to cause processor 125 to be flushed/redirected. Load pipeline 320 may not issue a complete indication 318 for the fused op in response to the redirection of processor 125. In some cases, a fused pair cannot be completed in a fused state. In such cases, LSU 230 may interact with MDR unit 220 to cause the load instruction and the conditional branch instruction to be refetched and executed as separate instructions. Load pipeline 320, in various embodiments, forwards the load result to the destination of the load/store instruction independent of whether or not the branch portion of the fused branch pair succeeds.

Figure 4:
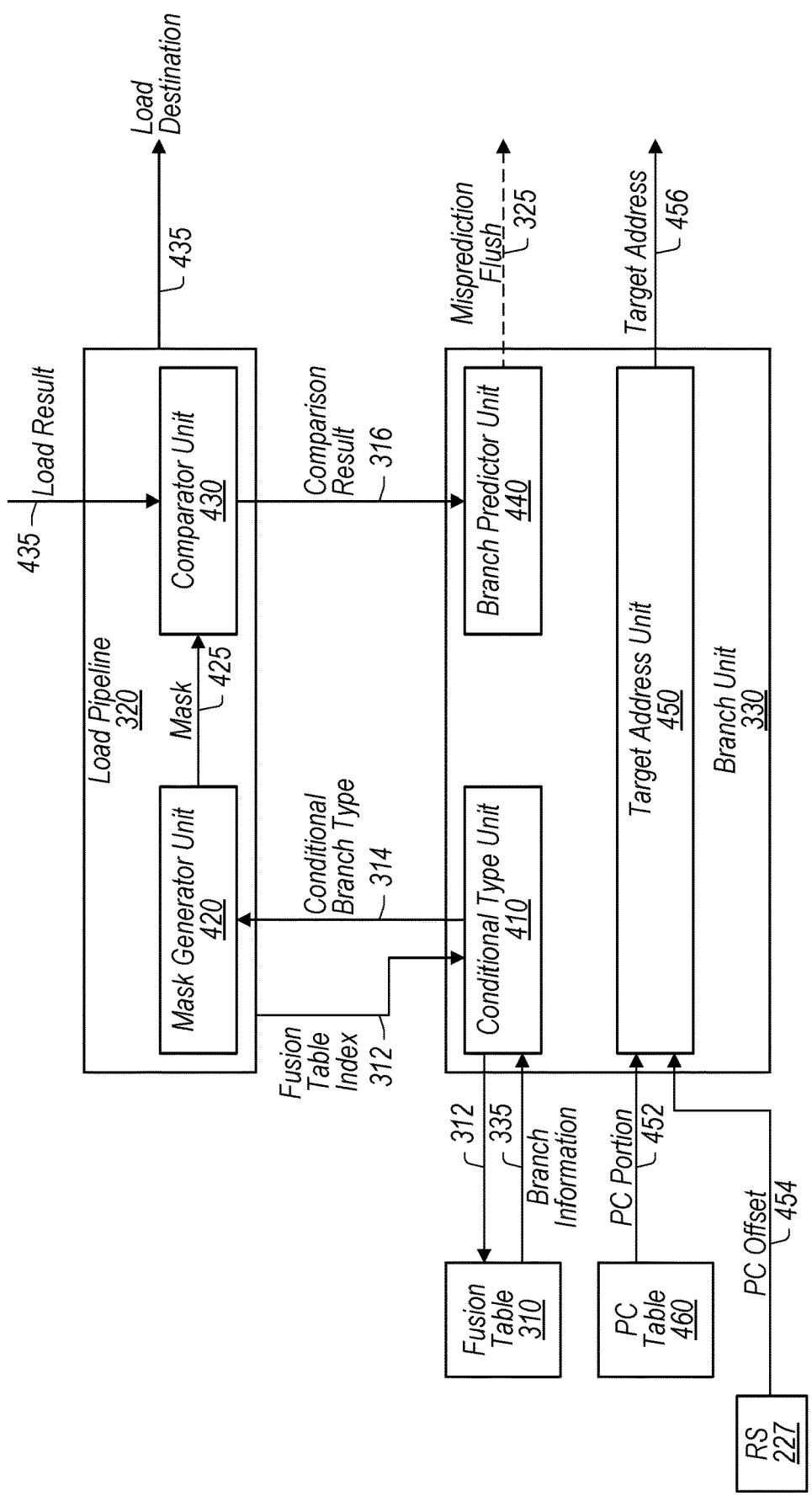
FIG. 4 is a block diagram illustrating example elements of a load pipeline and a branch unit, according to some embodiments.

Turning now to FIG. 4, a block diagram of example elements of load pipeline 320 and branch unit 330 involved in the processing of a fused load and conditional branch instruction pair is shown. In the illustrated embodiment, there is fusion table 310, load pipeline 320, branch unit 330, and a PC table 460. As further illustrated, load pipeline 320 includes a mask generator unit 420 and a comparator unit 430, and branch unit 330 includes a conditional type unit 410, a branch predictor unit 440, and a target address unit 450. The illustrated embodiment may be implemented differently. For example, branch unit 330 might include mask generator unit 420 instead of load pipeline 320 and thus provide masking information to load pipeline 320.

As mentioned, load pipeline 320 may receive a fused load op and extract a fusion table index 312 that it provides to branch unit 330 (particularly, conditional type unit 410). In various embodiments, prior to providing the fusion table index 312, load pipeline 320 is configured to interact with branch unit 330 to reserve a spot for the execution of the fused pair and to prevent branch unit 330 from performing the comparison for the fused pair. In a subsequent stage, load pipeline 320 may provide fusion table index 312 to conditional type unit 410. Conditional type unit 410, in various embodiments, is circuitry that is configured to provide load pipeline 320 with enough information to perform the comparison of the fused pair. Accordingly, conditional type unit 410 may use fusion table index 312 to access branch information 335 from an entry of fusion table 310. As mentioned, branch information 335 may include a branch payload that identifies the type of the branch. Conditional type unit 410 may extract the conditional branch type 314 from the branch payload and provide an indication of that type to mask generator unit 420.

Mask generator unit 420, in various embodiments, is circuitry configured to construct a mask 425 based on the information (e.g., the indication of the conditional branch type 314) received from conditional type unit 410. A mask 425 is used to identify one or more portions of a load result 435 on which to perform the branch comparison. For TBZ branch instructions, a mask 425 may identify a bit of a load result 435 while, for CBZ branch instructions, the mask 425 may identify the entire load result 435. But, in some embodiments, a mask 425 identifies smaller or larger portions of a load result 435 for those two types of branch instructions. After generating a mask 425, mask generator unit 420 provides the mask 425 to comparator unit 430 as shown.

Comparator unit 430, in various embodiments, is circuitry configured to compare the one or more portions of a load result 435 that are identified by a mask 425 with a certain value (e.g., zero). If the one or more portions equal that value, in various embodiments, comparator unit 430 provides a comparison result 316 to branch predictor unit 440 that indicates that the predicted branch direction should be taken. In response to receiving such a comparison result 316, branch predictor unit 440 does not issue a misprediction flush 325. But if the one or more portions do not equal the value, then comparator unit 430 provides a comparison result 316 to branch predictor unit 440 that indicates that the branch direction has been predicted incorrectly. In response to that comparison result 316, in various embodiments, branch predictor unit 440 issues a misprediction flush 325 in order to cause processor 125 to be flushed/redirected.

Target address unit 450, in various embodiments, is circuitry configured to generate a target address 456 for the branch portion of the fused pair. As mentioned, branch information 335 may include a PC index that is usable to access information from PC table 460. PC table 460, in various embodiments, is circuitry configured to store the upper portion of a program counter value (e.g., the upper 64 bits of a 128-bit program counter value). Accordingly, target address unit 450 accesses a PC portion 452 from PC table 460 using the PC index and receives a PC offset 454 (e.g., the lower 64 bits of a 128-bit PC value) from RS 227 as shown. Based on the PC portion 452 and the PC offset 454, in various embodiments, target address unit 450 generates the target address 456. Based on the comparison result 316, target address unit 450 may provide the target address 456 for fetching instructions.

Because load pipeline 320 is performing the comparison for the branch portion of the fused pair instead of branch unit 330, an execution unit that shares resources (e.g., a reservation station, register file ports, execution pipeline, and/or a result bus) with the branch unit 330 includes circuitry that is available, which would otherwise not be available for use while the branch unit 330 is executing a branch instruction. In various embodiments, the execution unit includes circuitry configured to execute arithmetic ops. Because the branch unit 330 is not being used for a branch comparison in the case of a fused load and branch instruction pair, the execution unit may be used to execute an arithmetic op during the period in which it would normally be used to execute the comparison of a conditional branch instruction.

Figure 5:
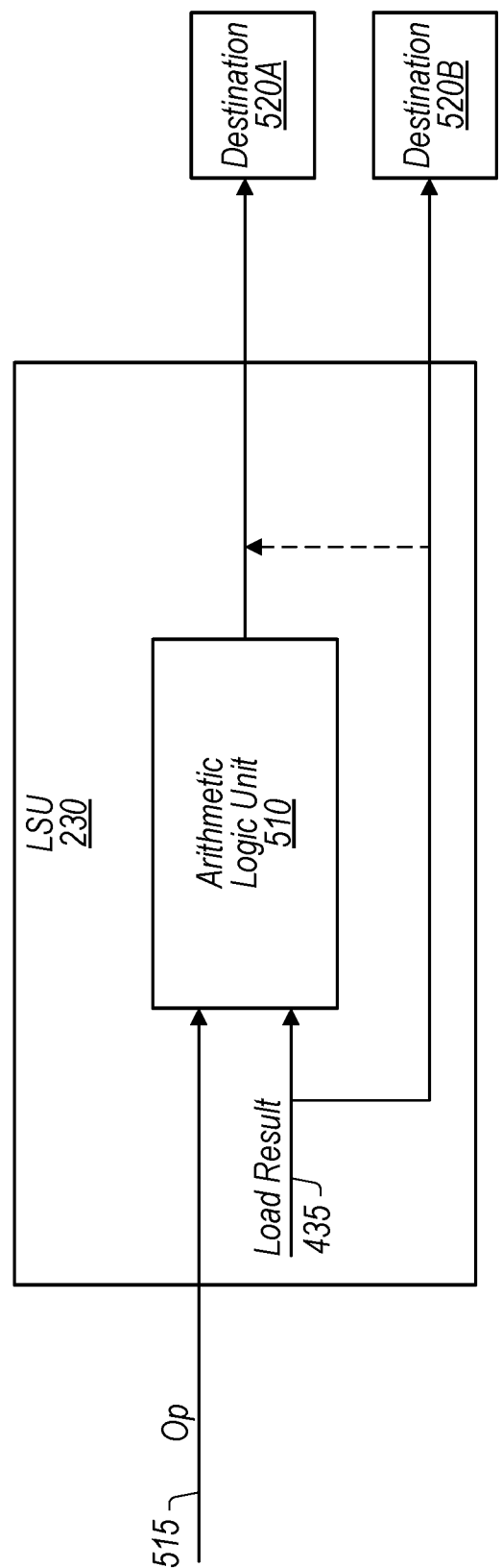
FIG. 5 is a block diagram illustrating an example LSU that includes an arithmetic logic unit, according to some embodiments.

Turning now to FIG. 5, a block of example elements of LSU 230 configured to execute a fused load and ALU instruction pair is shown. In the illustrated embodiment, LSU 230 includes an arithmetic logic unit (ALU) 510. In some embodiments, LSU may be implemented differently than shown.

As mentioned, in some cases, a load instruction is fused with an ALU instruction, such as an ADD, SUB, AND, or OR. In particular, fetch and decode unit 210 may scan across its decode lanes to identify potential ALU ops that can fuse with a load instruction. In various embodiments, only ops of the same bit width are fused—e.g., 32-bit load ops fuse with 32-bit ALU ops, 64 bit load ops with 64-bit ALU ops, etc. Fetch and decode unit 210 may mark the eligible ops by setting certain bits of those ops. MDR unit 220, in various embodiments, stores the ALU opcode and an immediate value (if applicable) in a load op table or fusion table 310. MDR unit 220 may overload a portion of the load op with a fusion bit and index information for accessing an entry of the load op table or fusion table 310. After overloading that load op, MDR unit 220 may then dispatch the resulting fused load op to LSU 230 via RS 232. In some embodiments, the ALU op of the fused pair is marked as complete at dispatch and the ALU op is not dispatched to an execution unit 240 via RS 227.

In response to receiving the fused load op, in various embodiments, LSU 230 issues memory requests to fetch the data from the memory location identified from the fused load op and accesses information about the ALU op (shown as op 515) using the index information of the fused load op. After receiving a load result 435 for the load op and op 515, LSU 230 may feed them into ALU 510 to perform op 515 in relation to load result 435. ALU 510, in various embodiments, is circuitry configured to perform arithmetic and bitwise operations on a set of values. For example, if op 515 is an add operation, then a value identified by op 515 is added to the load result 435. In some cases, the load op and op 515 may specify different destinations. As an example, op 515 might specify destination 520A while the load op specifies destination 520B. LSU 230, in various embodiments, is configured to forward, in the same clock cycle, the value of op 515 to the first destination and the load result 435 to the second destination. In some cases, the load op and op 515 may specify the same destination. In such cases, LSU 230 may be configured to forward the value of op 515 to the destination but not the load result 435.

Figure 6:
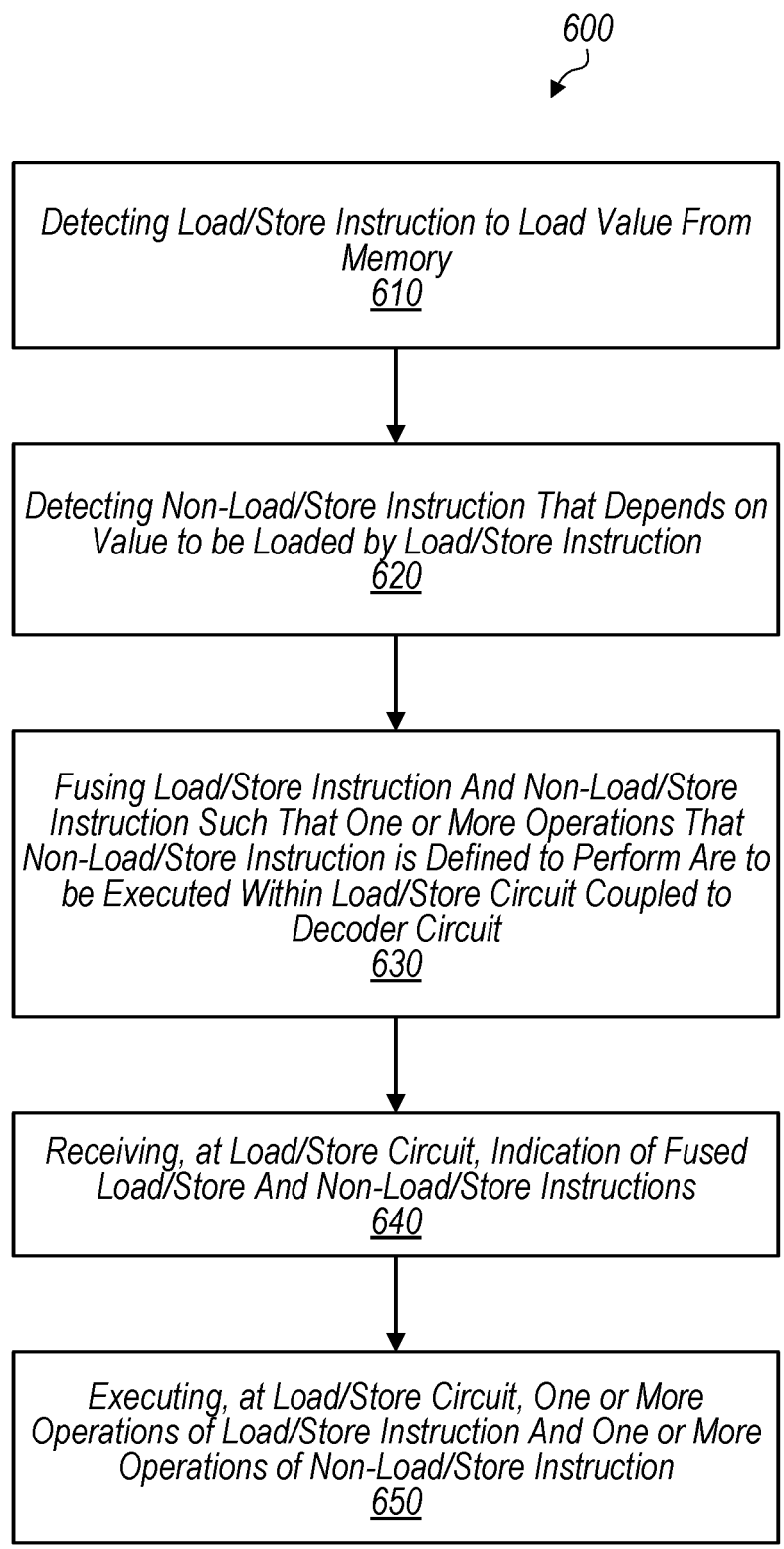
FIG. 6 is a flow diagram illustrating an example method relating to fusing and executing a load/store instruction with a non-load/store instruction, according to some embodiments.

Turning now to FIG. 6, a flow diagram of a method 600 is shown. Method 600 is one embodiment of a method performed by a processor (e.g., a processor 125) to fuse and execute a load/store instruction with a non-load/store instruction. In some embodiments, method 600 includes more or less steps than shown. For example, method 600 may include a step in which a result of executing one or more operations of the non-load/store instruction is forwarded by a load/store circuit (e.g., LSU 230) to a destination.

Method 600 begins in step 610 with a decoder circuit (e.g., a combination of fetch and decode unit 210 and MDR unit 220) of the processor detecting a load/store instruction to load a value from a memory (e.g., memory 110). In step 620, the decoder circuit also detects a non-load/store instruction (e.g., a conditional branch instruction, an ALU instruction, etc.) that depends on the value to be loaded by the load/store instruction.

In step 630, the decoder circuit fuses the load/store instruction and the non-load/store instruction such that one or more operations that the non-load/store instruction is defined to perform are to be executed within the load/store circuit. In various embodiments, the processor includes a fusion table circuit (e.g., fusion table 310) that is coupled to the decoder circuit. The decoder circuit may store, within an entry of the fusion table circuit, information (e.g., fusion information that may include branch information 335) that describes the fused load/store and non-load/store instructions. In some embodiments, the decoder circuit is configured to detect two instructions that are fusible and prevent fusion of the two instructions based on a detection that the fusion table circuit includes less than a threshold number of available entries (e.g., less than three entries). In step 640, the load/store circuit receives an indication (e.g., a fused load op) of the fused load/store and non-load/store instructions. The indication may include an index value (e.g., a fusion table index 312) that identifies the entry in the fusion table circuit.

In step 650, the load/store circuit executes one or more operations of the load/store instruction and the one or more operations of the non-load/store instruction. The one or more operations of the non-load/store instruction may be executed by a circuit (e.g., ALU 510) that is dedicated to performing operations of non-load/store instructions. Based on a detection that the fused load/store and non-load/store instructions cannot be completed in a fused state, the load/store circuit may cause the load/store instruction and the non-load/store instruction to be executed as separate instructions. In some cases, the non-load/store instruction is an ALU instruction and the load/store circuit includes an arithmetic logic circuit. The load/store circuit may be configured to load the value associated with the load/store instruction and execute, at the arithmetic logic circuit, the one or more operations of the non-load/store instruction in relation to the value. In some cases, the load/store instruction identifies a first destination and the non-load/store instruction identifies a second, different destination. The load/store circuit may be configured to forward, in a clock cycle, the value to the first destination and a result of executing the one or more operations of the non-load/store instruction to the second, different destination. In some cases, the load/store instruction and the non-load/store instruction identify a same destination. The load/store circuit may be configured to forward, to the destination, a result of executing the one or more operations of the non-load/store instruction but not the value associated with load/store instruction.

In some cases, the non-load/store instruction is a conditional branch instruction. The processor may also comprise a branch execution circuit (e.g., branch unit 330) coupled to the load/store circuit. The load/store circuit may be configured to load the value associated with the load/store instruction, detect whether the value satisfies a condition (e.g., is equal to zero) of the conditional branch instruction, and provide an indication (e.g., a comparison result 316) to the branch execution circuit on whether the condition has been satisfied. In some cases, the branch execution circuit may be configured to use an index value to access information from the fusion table circuit. Based on the information, the branch execution circuit may generate a target address (e.g., a target address 456) for the conditional branch instruction, identify a type of the conditional branch instruction, and provide an indication (e.g., a conditional branch type 314) of the type of the conditional branch instruction to the load/store circuit to enable the load/store circuit to execute a portion of the conditional branch instruction.

Figure 7:
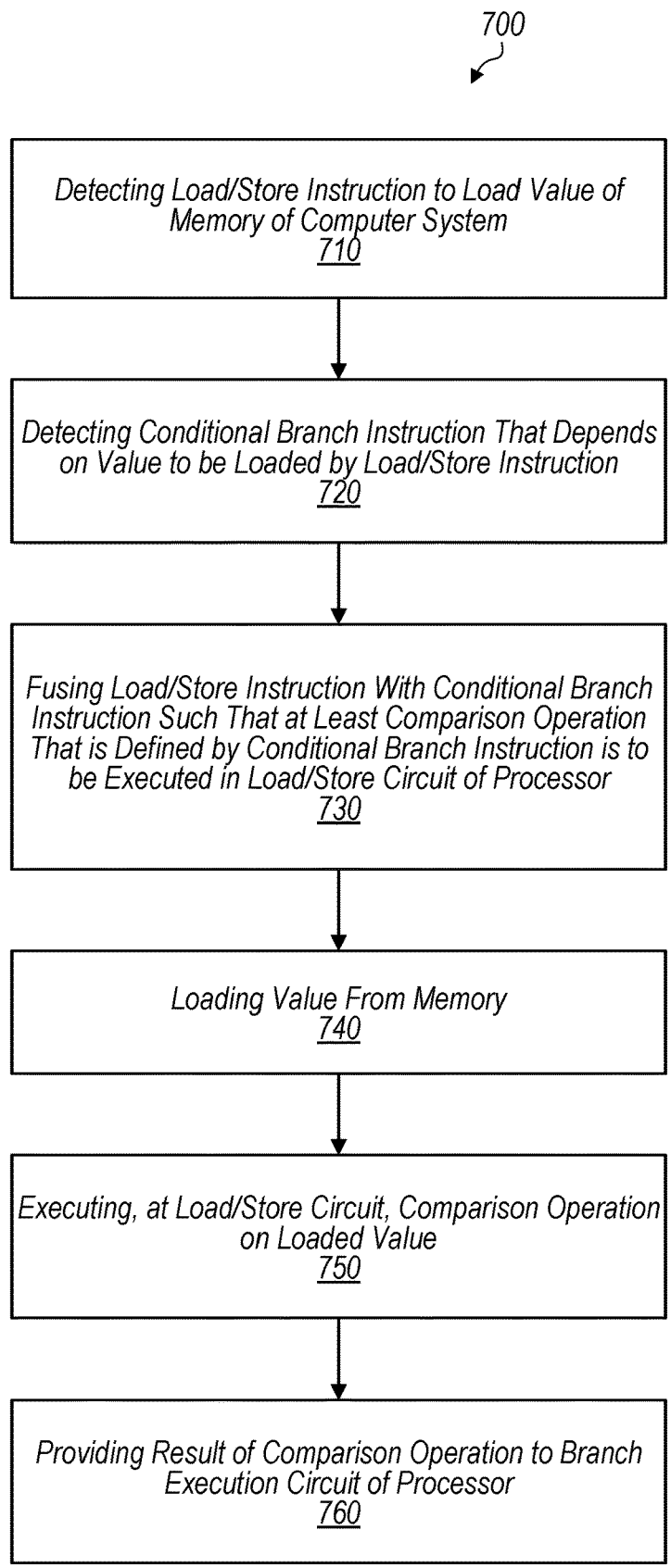
FIG. 7 is a flow diagram illustrating an example method relating to fusing and executing a load/store instruction with a conditional branch instruction, according to some embodiments.

Turning now to FIG. 7, a flow diagram of a method 700 is shown. Method 700 is one embodiment of a method performed by a processor (e.g., a processor 125) to fuse and execute a load/store instruction with a conditional branch instruction. In some embodiments, method 700 includes more or less steps than shown. For example, method 700 may include a step in which a result of executing the load/store instruction is forwarded by a load/store circuit (e.g., LSU 230) to a destination.

Method 700 begins in step 710 with the processor detecting a first load/store instruction to load a value of a memory (e.g., memory 110). In step 720, the processor detects a conditional branch instruction that depends on the value to be loaded by the first load/store instruction. In step 730, the processor fuses the load/store instruction with the conditional branch instruction such that at least a comparison operation that is defined by the conditional branch instruction is to be executed in a load/store circuit of the processor. In response to determining that the comparison operation is to be performed in the load/store circuit, the load/store circuit may communicate with the branch execution circuit to cause the branch execution circuit to not perform the comparison operation. In step 740, the load/store circuit of the processor loads the value from the memory.

In step 750, the load/store circuit of the processor executes the comparison operation on the loaded value. In some cases, the load/store circuit may provide, to the branch execution circuit, a pointer (e.g., a fusion table index 312) to an entry in a table circuit (e.g., fusion table 310) that stores branch information (e.g., branch information 335) about the conditional branch instruction. The load/store circuit may receive an indication of a type of the conditional branch instruction that enables the load/store circuit to execute the comparison operation. In some cases, the load/store circuit constructs a mask (e.g., mask 425) based on the indication received from the branch execution circuit. The mask may indicate one or more portions of the loaded value (e.g., load result 435) on which to perform the comparison operation. In step 760, the load/store circuit provides a result of the comparison operation to the branch execution circuit of the processor.

In some instances, the processor may detect a load/store instruction and an ALU instruction that depends on the load/store instruction. The processor may fuse the load/store instruction and the ALU instruction such that one or more operations that the ALU instruction is defined to perform are to be executed in the load/store circuit. The load/store circuit may execute the one or more operations of the ALU instruction in relation to a value associated with the load/store instruction.

Figure 8:
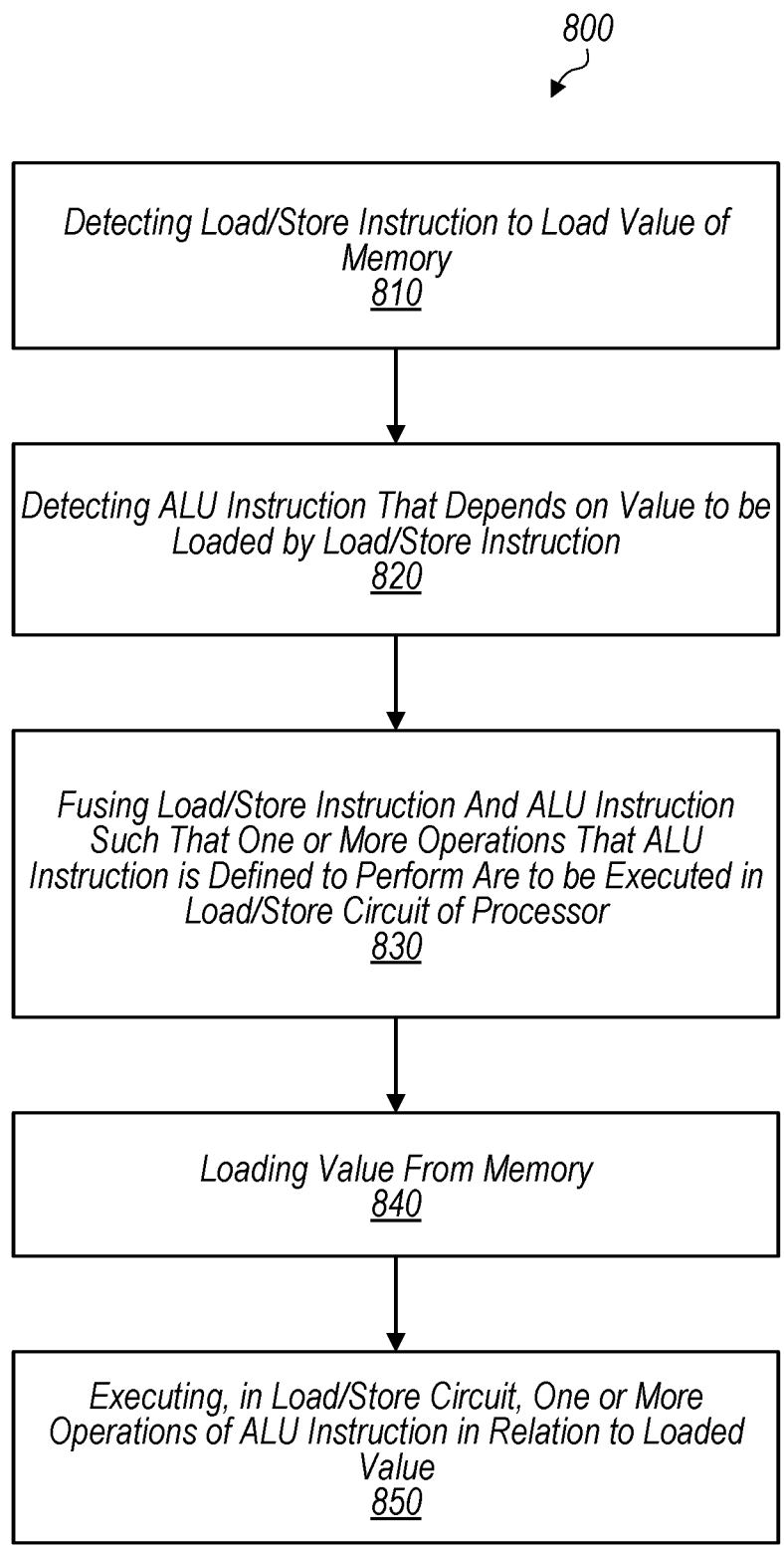
FIG. 8 is a flow diagram illustrating an example method relating to fusing and executing a load/store instruction with an ALU instruction, according to some embodiments

Turning now to FIG. 8, a flow diagram of a method 800 is shown. Method 800 is one embodiment of a method performed by a processor (e.g., a processor 125) to fuse and execute a load/store instruction with an ALU instruction. In some embodiments, method 800 includes more or less steps than shown. For example, method 800 may include a step in which a result of executing the load/store instruction is forwarded by a load/store circuit (e.g., LSU 230) to a destination.

Method 800 begins in step 810 with the processor detecting a load/store instruction to load a value of the memory. In step 820, the processor detects an ALU instruction that depends on the value to be loaded by the load/store instruction. In step 830, the processor fuses the load/store instruction and the ALU instruction such that one or more operations that the ALU instruction is defined to perform are to be executed in the load/store circuit of the processor. In step 840, the processor loads the value from the memory.

In step 850, the processor executes, in the load/store circuit, the one or more operations of the ALU instruction in relation to the loaded value. The load/store circuit may include an arithmetic logic circuit (e.g., ALU 510) configured to execute the one or more operations of the ALU instruction. The ALU instruction may be a shift instruction. In some cases, different destinations are identified by the ALU instruction and the load/store instruction. The processor may be configured to forward, within the same clock cycle, the loaded value and a result of an execution of the one or more operations to the different destinations. In some cases, the same destination is identified by the ALU instruction and the load/store instruction. The processor may be configured to forward, to the destination, a result of an execution of the one or more operations but not the loaded value associated with the first load/store instruction.

Figure 9:
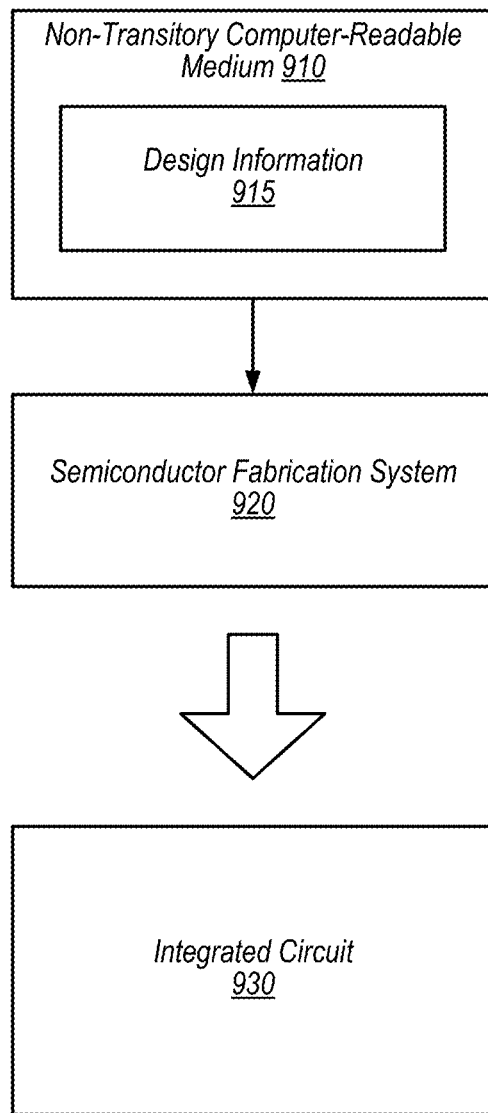
FIG. 9 is a block diagram illustrating an example process of fabricating at least a portion of an SOC, according to some embodiments.

Turning now to FIG. 9, a block diagram illustrating an example process of fabricating an integrated circuit 930 that can include at least a portion of SOC 100 is shown. The illustrated embodiment includes a non-transitory computer-readable medium 910 (which includes design information 915), a semiconductor fabrication system 920, and a resulting fabricated integrated circuit 930. In some embodiments, integrated circuit 930 includes at least a CPU complex 120, a memory controller 130, and one or more peripherals 140. Integrated circuit 930 may further additionally or alternatively include other circuits such as a wireless network circuit. In the illustrated embodiment, semiconductor fabrication system 920 is configured to process design information 915 to fabricate integrated circuit 930.

Non-transitory computer-readable medium 910 may include any of various appropriate types of memory devices or storage devices. For example, non-transitory computer-readable medium 910 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 910 may include two or more memory mediums, which may reside in different locations (e.g., in different computer systems that are connected over a network).

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries, which specify the synthesis and/or layout of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit (e.g., integrated circuit 930). For example, design information 915 may specify circuit elements to be fabricated but not their physical layout. In this case, design information 915 may be combined with layout information to fabricate the specified integrated circuit.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements described with reference to FIGS. 1-8. Furthermore, integrated circuit 930 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 930 is performed. Design information 915 may be generated using one or more computer systems and stored in non-transitory computer-readable medium 910. The method may conclude when design information 915 is sent to semiconductor fabrication system 920 or prior to design information 915 being sent to semiconductor fabrication system 920. Accordingly, in some embodiments, the method may not include actions performed by semiconductor fabrication system 920. Design information 915 may be sent to semiconductor fabrication system 920 in a variety of ways. For example, design information 915 may be transmitted (e.g., via a transmission medium such as the Internet) from non-transitory computer-readable medium 910 to semiconductor fabrication system 920 (e.g., directly or indirectly). As another example, non-transitory computer-readable medium 910 may be sent to semiconductor fabrication system 920. In response to the method of initiating fabrication, semiconductor fabrication system 920 may fabricate integrated circuit 930 as discussed above.

Figure 10:
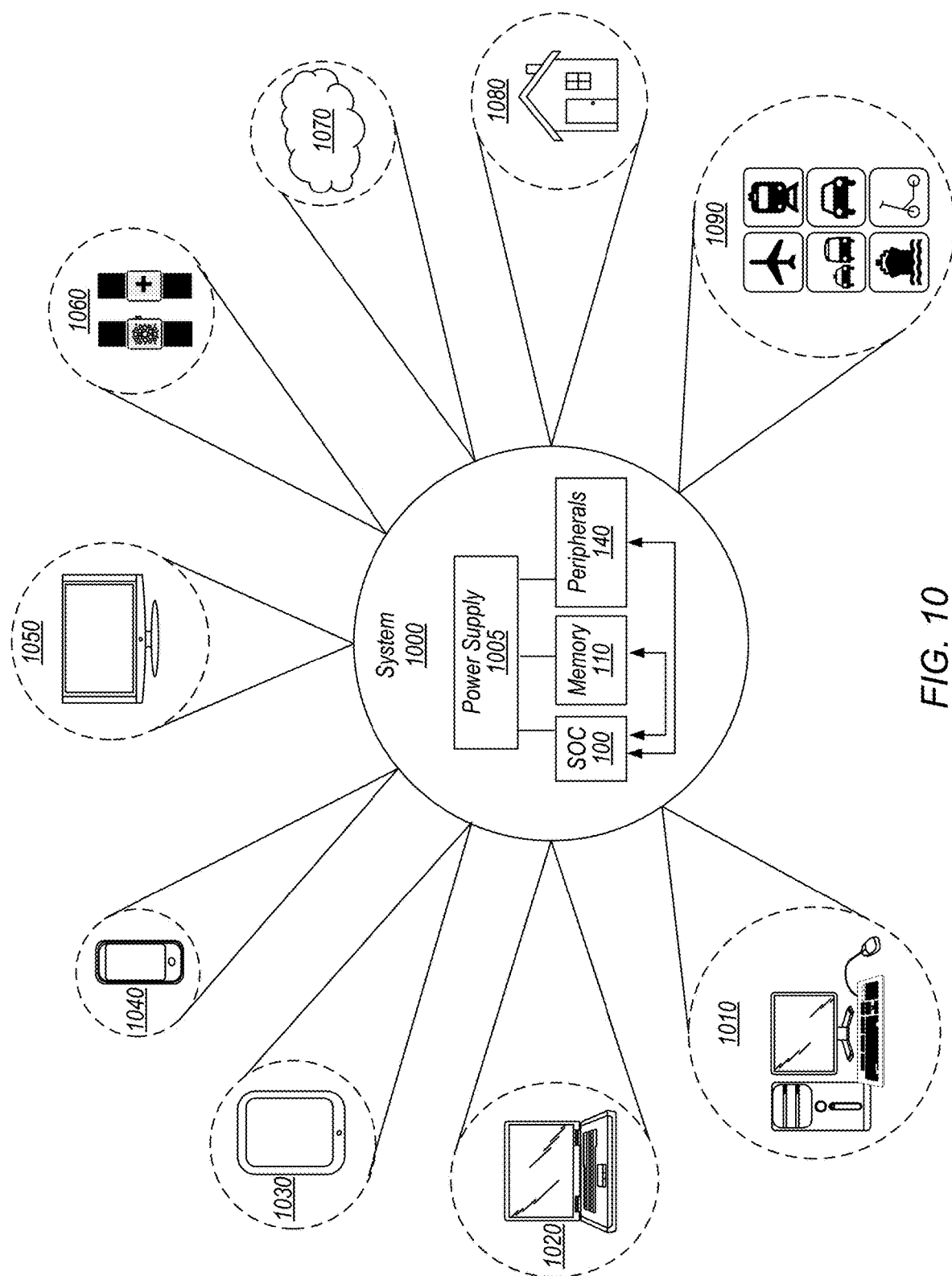
FIG. 10 is a block diagram illustrating an example SOC that is usable in various types of systems, according to some embodiments.

Turning next to FIG. 10, a block diagram of one embodiment of a system 1000 is shown that may incorporate and/or otherwise utilize the methods and mechanisms described herein. In the illustrated embodiment, the system 1000 includes at least one instance of a system on chip (SOC) 100 that is coupled to external memory 110, peripherals 140, and a power supply 1005. Power supply 1005 is also provided which supplies the supply voltages to SOC 100 as well as one or more supply voltages to the memory 110 and/or the peripherals 140. In various embodiments, power supply 1005 represents a battery (e.g., a rechargeable battery in a smart phone, laptop or tablet computer, or other device). In some embodiments, more than one instance of SOC 100 is included (and more than one external memory 110 is included as well).

As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a smartwatch and health monitoring device 1060. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1000 may further be used as part of a cloud-based service(s) 1070. For example, the previously mentioned devices, and/or other devices, may access computing resources in the cloud (e.g., remotely located hardware and/or software resources). Still further, system 1000 may be utilized in one or more devices of a home 1080 other than those previously mentioned. For example, appliances within home 1080 may monitor and detect conditions that warrant attention. For example, various devices within home 1080 (e.g., a refrigerator, a cooling system, etc.) may monitor the status of the device and provide an alert to the homeowner (or, for example, a repair facility) should a particular event be detected. Alternatively, a thermostat may monitor the temperature in home 1080 and may automate adjustments to a heating/cooling system based on a history of responses to various conditions by the homeowner. Also illustrated in FIG. 10 is the application of system 1000 to various modes of transportation 1090. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise. These any many other embodiments are possible and are contemplated. It is noted that the devices and applications illustrated in FIG. 10 are illustrative only and are not intended to be limiting. Other devices are possible and are contemplated.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A hardware processor, comprising:
a load/store circuit;
a branch execution circuit coupled to the load/store circuit; and
a decoder circuit coupled to the load/store circuit and configured to:
  detect a first instruction to load a first value from a memory;
  detect a conditional branch instruction that depends on the first value to be loaded by the first instruction; and
  fuse the first instruction and the conditional branch instruction such that one or more operations that the conditional branch instruction is defined to perform are to be executed within the load/store circuit;
wherein the load/store circuit is configured to:
  receive a first indication of the fused first instruction and conditional branch instruction; and
  load the first value from the memory;
  detect whether the first value satisfies a condition of the conditional branch instruction; and
  provide a second indication to the branch execution circuit on whether the condition has been satisfied; and
wherein the branch execution circuit is configured to:
  access information about the conditional branch instruction;
  determine the condition of the conditional branch instruction; and
  provide a third indication of the condition to the load/store circuit to enable the load/store circuit to detect whether the first value satisfies the condition.

2. The hardware processor of claim 1, further comprising:
a fusion table circuit that is coupled to the decoder circuit, wherein the decoder circuit is configured to:
  store, in an entry in the fusion table circuit, information that describes the fused first instruction and conditional branch instruction; and
  provide, to the load/store circuit, the first indication of the fused first instruction and conditional branch instruction, wherein the first indication includes an index value that identifies the entry in the fusion table circuit.

3. The hardware processor of claim 2 wherein the load/store circuit is configured to provide the index value to the branch execution circuit, and wherein the branch execution circuit is configured to:
use the index value to access the information from the fusion table circuit;
based on the information:
  generate a target address for the conditional branch instruction; and
  identify a type of the conditional branch instruction, wherein the third indication indicates the type of the conditional branch instruction.

4. The hardware processor of claim 1, wherein the decoder circuit is configured to detect a second instruction to load a second value from the memory and an arithmetic instruction, wherein the load/store circuit includes an arithmetic logic circuit, and wherein the load/store circuit is configured to:

load the second value from the memory/store instruction; and
execute, at the arithmetic logic circuit, one or more operations of the arithmetic instruction on the second value.

5. The hardware processor of claim 4, wherein the second instruction identifies a first destination and the arithmetic instruction identifies a second destination, wherein the load/store circuit is configured to:
forward the second value to the first destination and a result of the arithmetic instruction to the second destination.

6. The hardware processor of claim 4, wherein the second instruction and the arithmetic instruction identify a same destination, wherein the load/store circuit is configured to:
forward, to the same destination, a result of the arithmetic instruction but not the second value.

7. The hardware processor of claim 1, further comprising:
a fusion table circuit that is coupled to the decoder circuit, wherein the decoder circuit is configured to:
  detect two instructions that are fusible; and
  prevent fusion of the two instructions based on a detection that the fusion table circuit includes less than a threshold number of available entries.

8. The hardware processor of claim 1, wherein the load/store circuit is configured to:
based on a detection that the fused first instruction and conditional branch instruction cannot be completed in a fused state, cause the first instruction and the conditional branch instruction to be executed as separate instructions.

9. A method, comprising:
detecting, by a processor of a computer system, a first instruction to load a value of a memory of the computer system;
detecting, by the processor, a conditional branch instruction that depends on the value to be loaded by the first instruction;
fusing, by the processor, the first instruction with the conditional branch instruction such that at least a comparison operation that is defined by the conditional branch instruction is to be executed in a load/store circuit of the processor;
loading, by the load/store circuit, the value from the memory;
providing, by the load/store circuit to a branch execution circuit of the processor, a pointer to an entry in a table circuit, wherein the entry stores information about the conditional branch instruction;
receiving, by the load/store circuit from the branch execution circuit, an indication of a type of the conditional branch instruction;
executing, by the load/store circuit, the comparison operation on the loaded value, wherein the indication enables the load/store circuit to execute the comparison operation; and
providing, by the processor, a result of the comparison operation to the branch execution circuit.

10. The method of claim 9, further comprising:
constructing, by the load/store circuit, a mask based on the indication received from the branch execution circuit, wherein the mask indicates one or more portions of the loaded value on which to perform the comparison operation.

11. The method of claim 9, further comprising:
in response to determining that the comparison operation is to be performed within the load/store circuit, the load/store circuit communicating with the branch execution circuit to cause the branch execution circuit to not perform the comparison operation.

12. The method of claim 9, further comprising:
detecting, by the processor, a second instruction and an arithmetic instruction that depends on the second instruction;
fusing, by the processor, the second instruction and the arithmetic instruction such that one or more operations that the arithmetic instruction is defined to perform are to be executed in the load/store circuit; and
executing, by the load/store circuit of the processor, the one or more operations on a value associated with the second instruction.

13. The method of claim 12, wherein the second instruction identifies a first destination and the arithmetic instruction identifies a second destination, and wherein the method further comprises:
forwarding, by the load/store circuit, the value associated with the second instruction to the first destination and a result of the arithmetic instruction to the second destination.

14. A system, comprising:
a memory; and
a hardware processor that is coupled to the memory, includes a fusion table circuit, and is configured to:
detect a first instruction to load a value of the memory;
detect a non-load/non-store instruction that depends on the value to be loaded by the first instruction;
fuse the first instruction and the non-load/non-store instruction such that one or more operations that the non-load/non-store instruction is defined to perform are to be executed in a load/store circuit of the hardware processor;
store, in an entry in the fusion table circuit, information that describes the fused first instruction and the non-load/non-store instruction;
provide, to the load/store circuit, an indication of the fused first instruction and the non-load/non-store instruction, wherein the indication includes an index value that identifies the entry in the fusion table circuit;

load, in the load/store circuit, the value from the memory; and
execute, in the load/store circuit, the one or more operations on the value.

15. The system of claim 14, wherein different destinations are identified by the non-load/non-store instruction and the first instruction, and wherein the hardware processor is configured to:
forward, within a same clock cycle, the loaded value and a result of the one or more operations to the different destinations.

16. The system of claim 14, wherein a same destination is identified by the non-load/non-store instruction and the first instruction, and wherein the hardware processor is configured to forward, to the same destination, a result of the one or more operations but not the loaded value.

17. The system of claim 14, wherein the load/store circuit includes an arithmetic logic circuit that is configured to execute the one or more operations, and wherein the non-load/non-store instruction is a shift instruction.

18. The system of claim 14, wherein the hardware processor is configured to:
detect a second instruction and a conditional branch instruction that depends on the second instruction;
fuse the second instruction and the conditional branch instruction such that at least a comparison operation defined by the conditional branch instruction is to be executed in the load/store circuit;
execute, in the load/store circuit, the comparison operation to generate a result; and
provide the result to a branch execution circuit of the hardware processor.

19. The system of claim 18, wherein the branch execution circuit is configured to:
receive, from the load/store circuit, a pointer to a different entry in the fusion table circuit, wherein the different entry stores information about the conditional branch instruction; and
provide, to the load/store circuit, an indication of a type of the conditional branch instruction.

20. The system of claim 18, wherein the non-load/non-store instruction is an arithmetic instruction.

* * * * *

UNITED STATES PATENT AND TRADEMARK OFFICE
CERTIFICATE OF CORRECTION

| | | |
|---|---|---|
| PATENT NO. | : 12,008,369 B1 | Page 1 of 1 |
| APPLICATION NO. | : 17/652501 | |
| DATED | : June 11, 2024 | |
| INVENTOR(S) | : John D. Pape et al. | |

It is certified that error appears in the above-identified patent and that said Letters Patent is hereby corrected as shown below:

In the Claims

Column 24, Line 1, delete "/store instruction"

Signed and Sealed this
Third Day of September, 2024

Katherine Kelly Vidal

Katherine Kelly Vidal
*Director of the United States Patent and Trademark Office*